April 27, 1937.   A. RONNING   2,078,413
TRACTOR IMPLEMENT HITCH
Original Filed June 10, 1935   3 Sheets-Sheet 1

INVENTOR.
ADOLPH RONNING
BY
ATTORNEY.

INVENTOR.
ADOLPH RONNING
ATTORNEY.

April 27, 1937.     A. RONNING     2,078,413
TRACTOR IMPLEMENT HITCH
Original Filed June 10, 1935    3 Sheets-Sheet 3
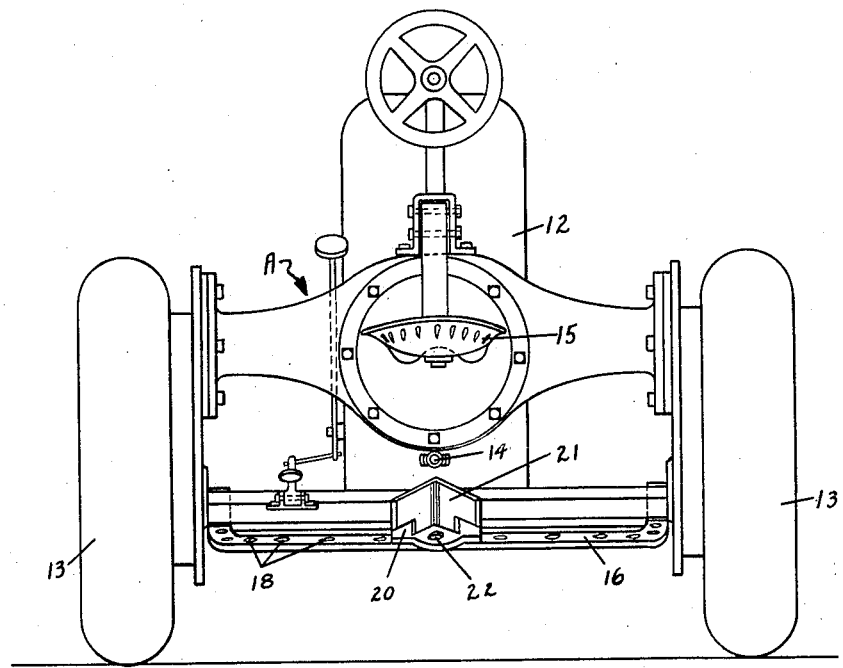
Fig. 7
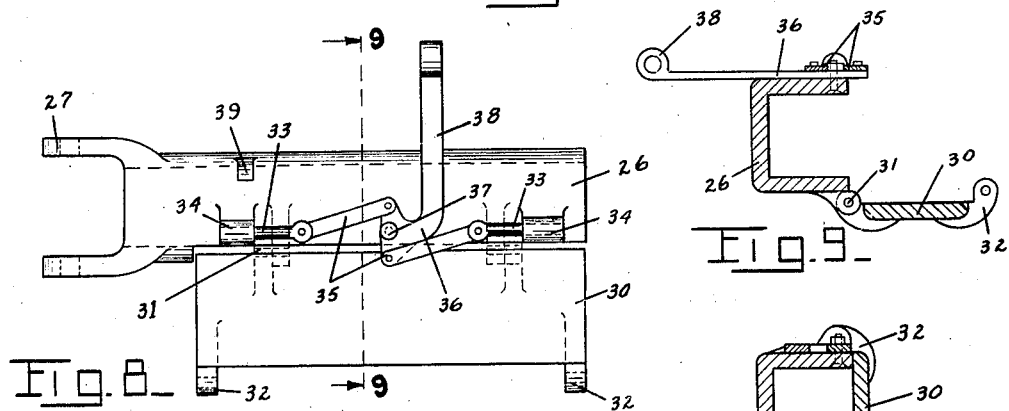
Fig. 8
Fig. 9
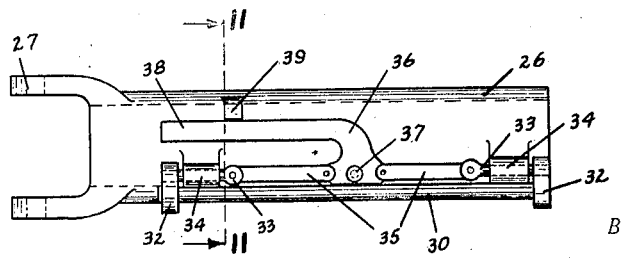
Fig. 10
Fig. 11
INVENTOR.
ADOLPH RONNING
BY
ATTORNEY.

Patented Apr. 27, 1937

2,078,413

UNITED STATES PATENT OFFICE 2,078,413

TRACTOR IMPLEMENT HITCH

Adolph Ronning, Minneapolis, Minn.

Original application June 10, 1935, Serial No. 25,833. Divided and this application March 27, 1936, Serial No. 71,219

5 Claims. (Cl. 280—33.15)

This invention relates to automatic hitch mechanisms for connecting a tractor, truck, or other powered unit, with a drawn vehicle or machine, and the primary object is to provide means of a novel, efficient and practical character for automatically connecting and disconnecting the two structures by mere movement manipulation of the powered unit. The mechanism is particularly designed for use in coupling or connecting an implement to a tractor and in the present instance shows a conventional harvester as the drawn or trailing machine. The advantages of the invention are especially marked in an arrangement which necessitates frequent connection and disconnection as between the implement and tractor. Such an arrangement is fully set forth and described in my copending application Serial No. 25,833, filed June 10, 1935, for Crop harvesting apparatus and method, of which the present application is a division, and hence it is only here necessary to note the desirability and advantages of the invention in various fields of use. A further object is to provide, in connection and association with a hitch, a new and improved coupling device for facilitating the coupling and uncoupling of a drawn implement drive shaft with the power takeoff shaft of the propelling tractor. Still other and more specific objects will be disclosed in the course of the following specification, reference being made to the accompanying drawings, wherein:

Fig. 1 is a side elevation of a harvester and the rear end of a tractor to which the harvester is connected by my improved hitch.

Figs. 2, 3, 4, and 5 are all enlarged detail side elevations of my improved automatic tractor-implement hitch, showing various parts thereof in the different positions assumed during the connecting and disconnecting operations.

Fig. 7 is a rear elevation of the tractor showing the hitch parts thereof disconnected from those of the implement to be drawn.

Fig. 8 is an enlarged detail plan view of the socket coupler employed in the power transmission connection, with the coupler open.

Fig. 9 is a sectional elevation on line 9—9 in Fig. 8.

Fig. 10 is a plan view of the coupler as shown in Fig. 8, but in closed and locked condition.

Fig. 11 is a detail sectional elevation on line 11—11 in Fig. 10.

Figure 1:
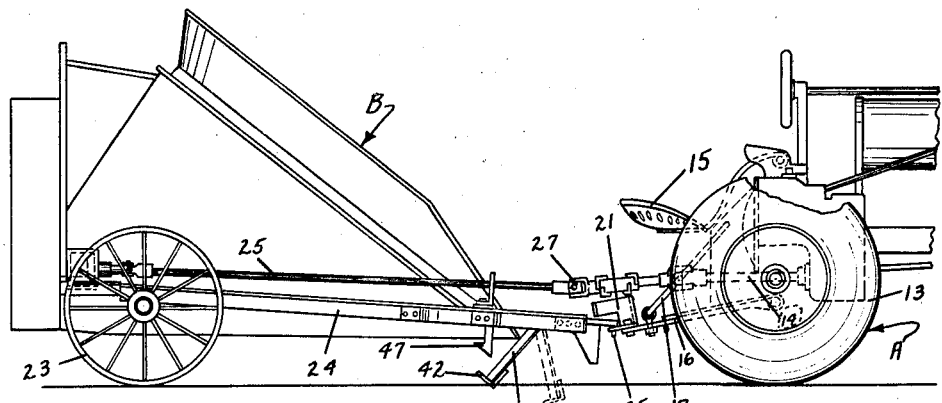

Referring to the drawings more particularly and by reference characters, A designates generally the tractor or propelling unit and it may be of conventional design having power plant 12, rear wheels 13, power takeoff shaft 14, driver's seat 15, and U-shaped draw bar or draft frame 16 extending rearwardly as shown and supported by lateral brace rods 17. The draw bar 16 is shown as of the type having a series of transversely spaced holes 18 by which implements may be laterally adjusted and secured for trailing arrangement behind the tractor. In the present instance I rigidly secure to the draft bar 16, by bolts 19, a bracket 20 which has an angular or V-shaped extension 21 the purpose of the wings of which is to guide a hitch bar centrally into hitching position whereby a depending pin of such bar may automatically be centered over and drop into a perforation 22 in the bracket.

Various types and designs of drawn units or implements are connectible with the tractor A by my improved hitch, and I have here shown merely for purpose of illustration a harvester, designated generally by letter B. This machine comprises supporting wheels 23 from which forwardly extends a draft frame or tongue 24, and gathering and harvesting mechanism adapted to be driven by a shaft 25 as more particularly set forth in my parent application Ser. No. 25,833.

The forward end of power shaft 25 has a coupler housing or box 26 which is attached to the shaft 25 by a universal joint 27, and has a socket or chamber that is square in cross section, as indicated in Figure 11. This chamber is open at its rear end to slidably and releasably receive a squared shank extension 28 of the power takeoff shaft 14, such extension and shaft being connected by a universal joint 29. The telescoping arrangement of parts 26 and 28, complemented by the universal joints 27 and 29, insures proper power transmission from shaft 14 to shaft 25 while permitting all necessary angular, vertical, and transverse adjustments as between the parts as the harvester is drawn in trailing arrangement behind the tractor through the hitch connection.

As will presently be explained, the implement hitch is coupled and uncoupled by mere movement manipulation of the tractor. This method, however, is not followed in connecting up the power transmission coupling as it is preferable to first connect up the tractor harvester hitch before establishing operative connection between the shafts 14 and 25. For this reason the coupler 26 is designed so that one side wall 30 thereof is hingedly attached to the remaining portion as at 31, and is provided at the edge opposite from the hinges with a pair of perforate lugs 32 for receiving a pair of lock bolts 33 that are slidable in lugs 34 of the coupler housing, and are connected by links 35 to a lever 36 that is pivoted to the coupler as at 37, and has an operating handle 38 adapted to snap into locked position with respect to a lug 39 formed integrally with the coupler housing 26.

To operatively connect the members 28 and 26 the side wall or cover 30 is first opened, whereupon the shank 28 may be placed by a lateral movement into the coupler socket, the locking mechanism in the meantime being in the position indicated in Fig. 8. After the shank 28 has thus been placed into position the plate 30 is swung closed, thereupon bringing the lugs 32 into alignment with the lock bolts 33. The lever handle 38 is then swung over to the position indicated in Fig. 10, thereby projecting the bolts 33 into the lugs 32 to lock the plate 30 in closed position. The lever handle 38 is preferably made of material that may be flexed slightly so that it may pass over the lug 39, and is releasably locked in this position until the lever handle is first lifted sufficiently so that it can be moved over the lug 39.

From the foregoing it will be seen that a very simple and efficient device is provided for establishing driving relation between the power take-off shaft of the tractor and the primary driving shaft 25 of the harvester, and that this connection can be made after the harvester has been hitched to the draw-bar of the tractor.

Figure 2:
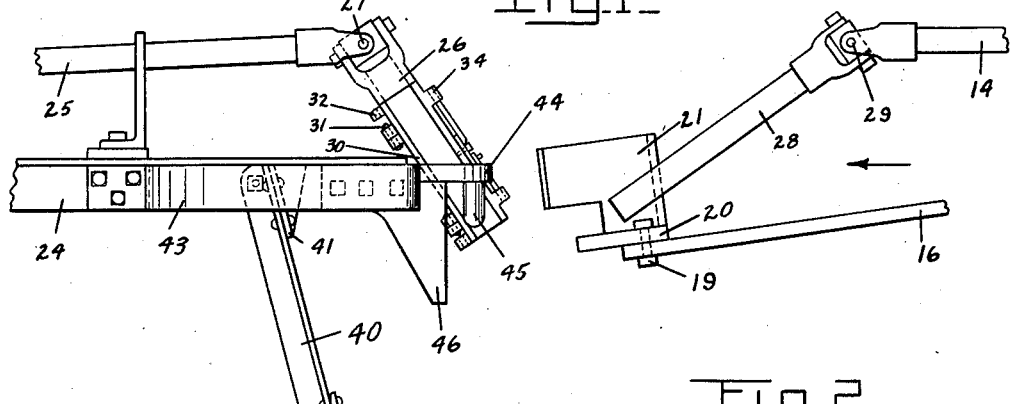

The hitch mechanism which automatically connects and disconnects the harvester with respect to the bracket unit 20—21 of the tractor draw-bar 16 may be described as follows. The forward end of the harvester frame or tongue 24 is provided with a supporting leg 40 which is pivotally attached at its upper end to the vertical flange of the main drive frame beam so that it may be swung rearwardly, but its forward movement is checked by a lug 41 which stops against the horizontal flange of the beam to which the leg is attached. To the lower end of the leg is rigidly secured an angle iron cross piece or foot 42 which rests flat upon the ground when the leg is in a vertical position, as shown in Fig. 5, and which will also support the leg when it is in a slightly rearwardly inclined position, as indicated in Fig. 2, which figure also indicates the rearmost position of the leg.

At the forward end of the tongue 24 there is rigidly secured an auxiliary frame or lateral extension 43, which includes a forwardly extending bar 44 having a depending pin 45 for engagement in the perforation 22 of bracket 20 rigidly secured to the draw-bar 16 of the tractor. As previously noted, the V-shaped extension 21 of this bracket operates, when the tractor is backed into connecting position, to guide the bar 44 centrally into position so that the pin 45 may drop into the hole 22 in the bracket. It may be noted that the lower rear corners of the bracket wings 21 are cut away to permit greater latitude in the swinging movement of the bar 44 when the pin 45 is down and the implement B is trailing at a sharp angle with respect to the tractor.

Figure 5:
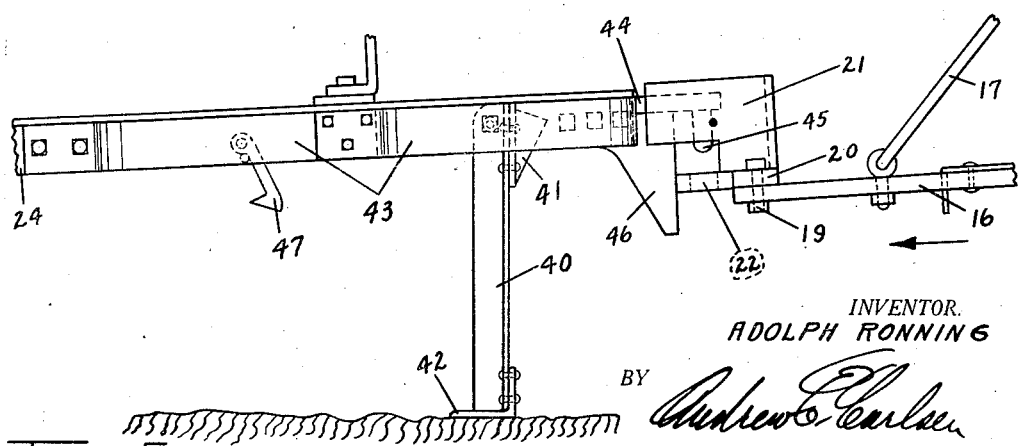

Extending downwardly from but rigidly secured to the bar 44 is a push plate 46 against the forward edge of which the bracket 20 may contact when the parts are in the position shown in Fig. 5.

Figure 4:
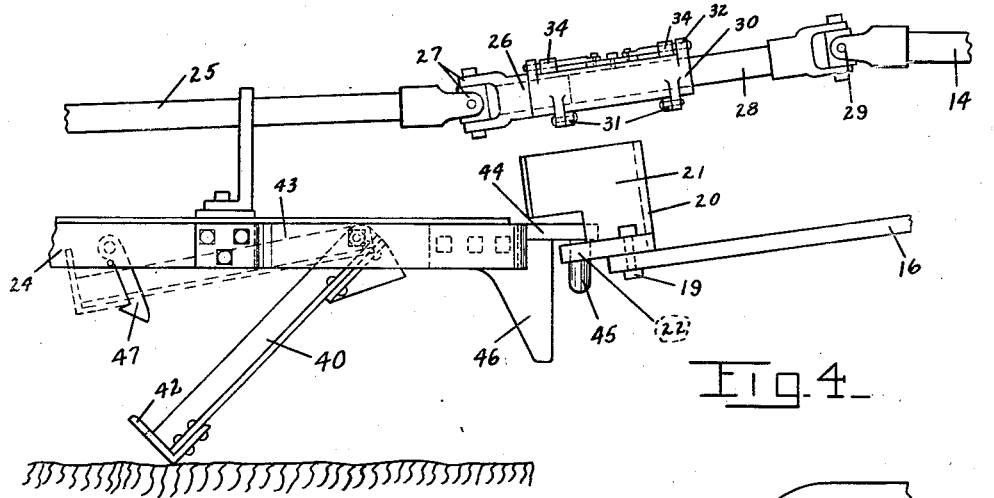
Figure 6:
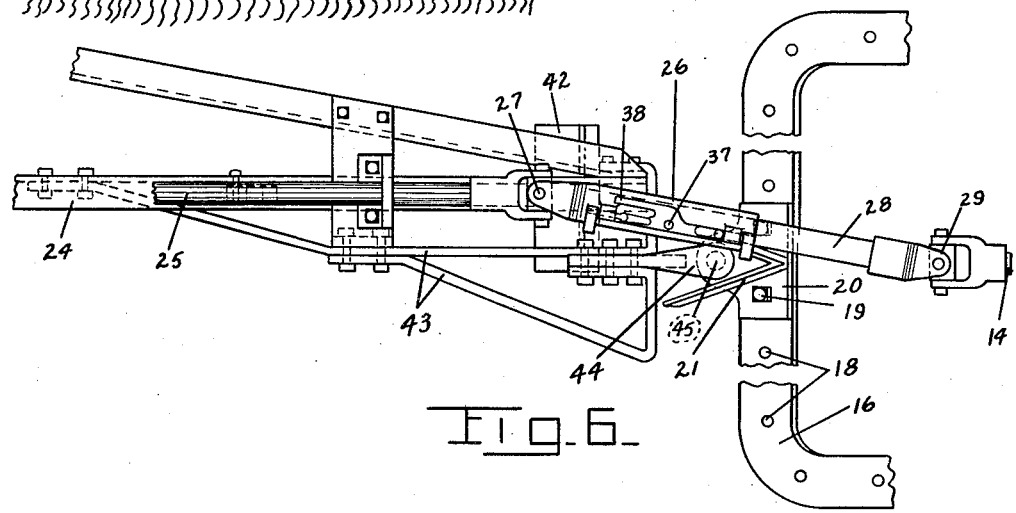
Fig. 6 is a plan view of the hitch and power transmission fully connected as in the elevation shown in Fig. 4.

At a rearward point the draft frame 24 of the harvester is provided with a latch hook 47 which is so arranged that it may be used to hold the leg 40 in a raised and inactive position, as indicated by the dotted lines in Fig. 4. The leg is secured in this position when it is desired to establish a more permanent connection in the tractor harvester hitch. Under normal working conditions, however, the leg 40 merely drags on the ground in a rearwardly inclined position, as shown in Figs. 1 and 4.

When it is desired to disconnect the tractor, leaving the harvester behind, then it is only necessary for the tractor operator to reverse or back up the tractor, whereupon the leg 40 will move into the position shown in Fig. 2, at which time the pin 45 is entirely lifted from the bracket 20 and remains in this lifted position when the rearward tractor movement stops, as it is held at this elevation by the more vertical position of the leg 40. The operator now merely drives the tractor forward, as the hitch is entirely disconnected, and when doing so the power shank 28 merely pulls out of the coupler 26 so that these two members will drop into the positions shown in Fig. 2.

Figure 3:
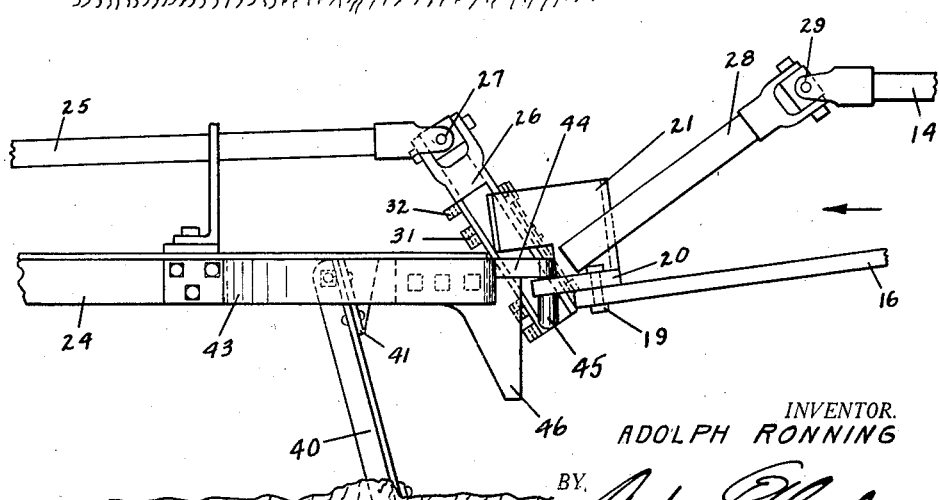

When the operator now returns the tractor to the harvester, and desires to reestablish the hitch connection, he merely backs the tractor up until the bar 44 reengages the bracket extension 21 to thereby center the pin 45 over the hole 22 in the bracket proper. The rearward movement is then continued, whereupon the bracket 20 engages the push plate 46, as indicated in Fig. 5, and then continues to move the tractor backward a short distance so as to push the foot 42 down into the earth in an inclined direction, as indicated in Fig. 3. As the foot thus moves downwardly into the earth, the draft frame 43 following with it, is also lowered until the pin 45 reengages the bracket 20, thereby reestablishing the pull connection. After this has been done the operator again drives forwardly, whereupon the leg 40 will pivot on the foot 42, and thus slightly raise, but inasmuch as the foot pivots at a level under the ground surface it does not raise the draft beam sufficiently to disengage the pin 45 from the bracket 20. Consequently, as the machine continues to move forward the leg 40 will assume the dragging position, as shown in Figs. 1 and 4.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hitch for detachably connecting the draft member of a trailing vehicle to a draw member of a self-propelled vehicle, comprising a pair of normally connected coupling elements secured one to each of said members and vertically separable to effect disconnection, means operative upon initial rearward movement of the vehicles to cause such vertical coupling elements to separate and thus disconnect the vehicles, said means including a device operative upon a successive and secondary rearward movement of the vehicles to vertically close the coupling elements and reconnect the vehicles.

2. A hitch for detachably connecting the draft member of a trailing vehicle to a draw member of a self-propelled vehicle, comprising a pair of normally connected coupling elements secured one to each of said members and vertically separable to effect disconnection, means operative upon initial rearward movement of the vehicles to cause such vertical coupling elements to separate and thus disconnect the vehicles, and operative upon a secondary succeeding rearward movement to reestablish the hitch connection, said means including a leg tiltably and supportably associated with one of the coupling elements.

3. A hitch for detachably connecting the draft member of a trailing vehicle to a draw member of a self-propelled vehicle, comprising a pair of normally connected coupling elements secured one to each of said members and vertically separable to effect disconnection, means operative upon initial rearward movement of the vehicles to cause such vertical coupling elements to separate and thus disconnect the vehicles, and operative upon a secondary succeeding rearward movement to reestablish the hitch connection, said means including a leg tiltably and supportably associated with one of the coupling elements, said leg being movable from a rearward inclined to a forward generally upright position, and having means at its lower end guiding it downwardly below the ground surface during the aforesaid secondary rearward movement.

4. A hitch for detachably connecting the draft member of a trailing vehicle to a draw member of a self-propelled vehicle, comprising a pair of normally connected coupling elements secured one to each of said members and vertically separable to effect disconnection, a tiltable leg associated with one of the members and adapted upon being moved to an erect position to lift the member to separate the coupling elements, means at the lower end of the leg for guiding it downwardly below the earth surface when pushed rearwardly and while still in such erected position to thereby lower said lifted member and reconnect the coupling elements, and means establishing a vertically adjustable push connection between said draft and draw members.

5. A hitch for detachably connecting the draft member of a trailing vehicle to a draw member of a self-propelled vehicle, comprising a pair of normally connected coupling elements secured one to each of said members and vertically separable to effect disconnection, a tiltable leg associated with one of the members and adapted upon being moved to an erect position to lift the member to separate the coupling elements, means at the lower end of the leg for guiding it downwardly below the earth surface when pushed rearwardly and while still in such erected position to thereby lower said lifted member and reconnect the coupling elements, and means establishing a vertically adjustable push connection between said draft and draw members, said last mentioned means comprising a vertical arm rigidly attached to the draft member and disposed to abut forwardly against the coupling element of the draw member, and with sliding contact therewith permitting vertical adjustment of the draft member while retaining its pushing connection with reference to the draw member.

ADOLPH RONNING.